United States Patent [19]

Takeuchi et al.

[11] 4,134,001

[45] Jan. 9, 1979

[54] PROCESS FOR WELDING COPPER MATERIALS

[75] Inventors: Yo Takeuchi, Omiya; Masaki Morikawa, Urawa; Chuji Tanaka; Tosiharu Hiji, both of Ageo, all of Japan

[73] Assignee: Mitsubishi Kinzoku Kabushiki Kaisha, Ohtemachi, Japan

[21] Appl. No.: 841,320

[22] Filed: Oct. 11, 1977

[51] Int. Cl.² ............................................. B23K 9/00
[52] U.S. Cl. ............................................. 219/137 R
[58] Field of Search ........... 219/137 R, 118, 137 WM

[56] References Cited

U.S. PATENT DOCUMENTS

| 2,206,375 | 7/1940 | Swift | 219/137 R |
|---|---|---|---|
| 3,524,039 | 8/1970 | Ashmore | 219/137 R |

OTHER PUBLICATIONS

T. Lyman, Ed., *Metals Handbook*, 1971, vol. 6, p. 349.
*International Standard of Resistance for Copper*, p. 4, 1925.

*Primary Examiner*—J. V. Truhe
*Assistant Examiner*—Clifford C. Shaw
*Attorney, Agent, or Firm*—Wenderoth, Lind & Ponack

[57] ABSTRACT

A process for welding a pair of thick copper plates which comprises welding the pair of copper plates with respective edges placed adjacent to each other on a backing support made of carbon at the adjacent edges in an atmosphere of an inert gas by melting a filler metal with the use of a direct current arc generated between the copper plates connected to the negative pole and a positive electrode with an arc voltage V (volt) and a welding current I (ampere) satisfying the conditions:

$$V = 37 - 45 \quad (1)$$

$$VI > Q \quad (2)$$

$$I^2/\sqrt{V} < F \quad (3)$$

wherein Q and F are respectively determined from the equations:

$$Q = V_a I_a \quad (4)$$

$$F = I_b^2/\sqrt{V_a} \quad (5)$$

wherein Ia (ampere) is the minimum current at which a penetration to the underside of the copper plate is obtained and Ib (ampere) is the minimum current at which a blow hole is formed in the weld by the decomposition of the backing support at any voltage Va (volt) within the above stated range (1).

The above stated process makes it possible to weld thick copper plates without causing the oxidation of the weld bead and occurrence of blow holes in the weld bead. Furthermore, this process can be carried out without pre-heating or grooving the copper plates and does not require post-treatment of the underside bead of the weld and is, thus, very economical.

9 Claims, 10 Drawing Figures

PROCESS FOR WELDING COPPER MATERIALS

BACKGROUND OF THE INVENTION

The present invention relates to an economical process for arc welding thick plates of pure copper or copper alloys from one side only in an atmosphere of an inert gas with the use of a backing support.

In recent years, pure copper or copper alloy materials have been used in the production of various apparatus and articles including industrial furnaces and electronic components and parts because of their excellent thermal conductivity, electrical conductivity, strength and ductility. In the production of these furnace and parts, a gas shielded arc welding process has been often utilized. Welding of these copper materials entails two problems to be considered which are not encountered in the welding of steel. First, copper or its alloy to be welded has good fluidity and tends to fall off the welding part or area. The second problem is that because the copper materials have good thermal conductivity, they require a greater heat input than the net heat required for fusing a filler metal, and it is nonetheless difficult to obtain a satisfactory joint with a sufficient penetration.

Heretofore, in order to overcome the first problem, a backing support consisting of a copper or water-cooled copper plate has been placed on the underside of the welding area of the copper plates and welding of the copper plates has been carried out from the opposite side of the backing support. However, the use of these backing supports entails the following disadvantages.

(1) It is difficult to shield the area to be welded from the side where the backing support is placed and the moisture or oxygen present in air dissolves into the metal to be welded, thus causing blow holes or cracks in the metal and at the same time embrittling the metal.

(2) Because of its relatively low melting point, the backing support may be melt-bonded to the joint, and removal of the support thus bonded is troublesome.

On the other hand, it is known to use a heat-resistant inert material such as an asbestos sheet and a carbon plate as a backing support. Among these, a backing support made of carbon has been found to be particularly good. This is not simply because the backing support made of carbon is heat resistant and inert, but rather because it creates a reducing atmosphere in the vicinity of an underside or back bead due to the heat of welding, so that it is possible to produce a sound weld by preventing the back bead from being oxidized without further shielding with an inert gas.

Also, the carbon backing support has an advantage in that it makes possible the formation of a flat back bead by welding from only one side of the copper plates to be welded without post-treatment after welding under suitable welding conditions because the support is non-reactive with molten metals. Further, the carbon support is a good heat insulator.

The second problem of heat loss is more troublesome. Welding of copper materials requires a heat input which is about 7 times as much as that required in the welding of steel in order to obtain the same welding performance because copper materials have a high thermal conductivity. If this large quantity of heat is not supplied, satisfactory welding results cannot be obtained. This heat loss problem obviously becomes conspicuous particularly when a pair of the copper plates to be welded (hereinafter sometimes referred to collectively as "parent plate") is increased in thickness because the heat capacity of the welding area or part is correspondingly increased.

One approach to solve the heat loss problem which has been heretofore proposed is to increase the heat input by increasing the welding current. However, this method is disadvantageous in that it results in a high proportion of defective welds, and, in particular, when the above mentioned carbon backing support is used, the support is subjected to an excessive heat input and perforating action of the arc, whereby blow holes are formed in the weld due to decomposition of the support.

A second approach to solve the heat loss problem is to pre-heat the parent plate to a temperature of 100° to 600° C. This method is certainly effective for reducing the requirement of a high heat input to be supplied by an arc. However, this method requires a pre-heating process and apparatus therefor which renders it disadvantageous from the viewpoint of economy.

A third approach to a solution of the heat loss problem is to form a groove, for examle, in a V or U shape, in the welding part to reduce the heat capacity of the part. This method requires a machining process prior to welding and, therefore, is uneconomical.

Heretofore, a combination of the pre-heating and the groove preparation has been generally used for welding copper plates having a thickness of 5 mm or more. However, such a process has the various disadvantages as stated above.

SUMMARY OF THE INVENTION

It is a primary object of the present invention to provide an economical process for welding a thick copper plate.

More specifically, it is one object of the present invention to provide a process for welding thick copper plates wherein it is possible to form a flat back bead by welding from only the right side of the parent plate without post-treatment while preventing the back bead from being oxidized by using a backing support made of carbon.

It is another object of the present invention to provide a process for welding thick copper plates wherein uneconomical pre-heating can be omitted.

Still another object of the present invention is to provide a process for welding thick copper plates wherein a groove preparing process can be omitted.

The above stated objects and other objects of the present invention can be accomplished by a process for welding a pair of thick copper plates (parent plate) which comprises welding the pair of copper plates having respective edges placed adjacent to each other on a backing support made of carbon at their adjacent edges in an atmosphere of an inert gas by melting a filler metal with the use of a direct current arc generated between the copper plates connected to the negative pole and a positive electrode with an arc voltage V (volt) and a welding current I (ampere) satisfying the following conditions:

$$V = 37\text{--}45 \qquad (1)$$

$$VI > Q \qquad (2)$$

$$I^2/\sqrt{V} < F \qquad (3)$$

wherein Q and F are respectively determined from the following equations:

$$Q = VaIa \tag{4}$$

$$F = Ib^2/\sqrt{Va} \tag{5}$$

wherein Ia (ampere) is the minimum current at which a penetration to the underside of the copper plate is obtained and Ib (ampere) is the minimum current at which a blow hole is formed in the weld due to the decomposition of the backing support at any voltage Va within the above stated range (1).

In accordance with the present invention, a high heat input required for welding thick plates is provided by using, instead of an increased current, a voltage as high as 37 to 45 V higher than that used in a conventional welding process while using the carbon-made backing support. Because increasing of the current is not resorted to in the present invention formation of blow holes in the welded area due to the excessive decomposition of the carbon-made backing support is avoided. That is, the present invention contemplates controlling any excessive perforating action of an arc due to an excessive current thereby to prevent the arc from impinging on the backing support through a molten metal, and attaining the remainder of penetration to the underside of the parent plate resuired to attain good welding by a heat input supplied by the arc and conducted through the parent plate per se.

In addition, the present invention provides a procedural scheme for determining the desired level of the welding current at any constant arc voltage Va within the specified range of 37 to 45 V by carrying out a simple experiment.

Further features of the present invention will be apparent from the following detailed description when read in conjunction with the accompanying drawings.

DETAILED DESCRIPTION

Figure 1:
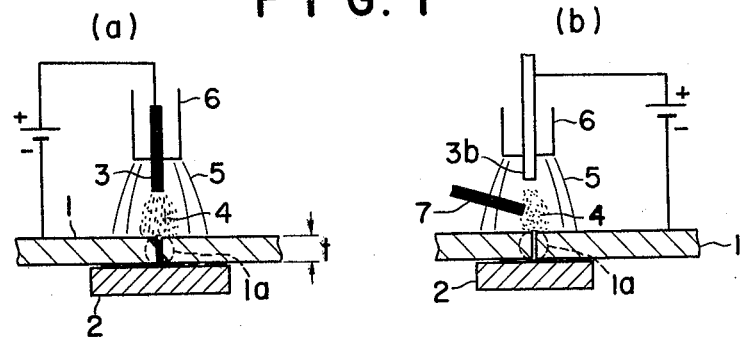
FIGS. 1(a) and 1(b) are diagrammatic cross-sectional views showing two representative examples of the welding process of the present invention, FIG. 1(a) illustrating a MIG process and FIG. 1(b) illustrating a TIG process.

FIG. 1 illustrates two representative examples of the welding process of the present invention, FIG. 1(a) showing a metal inert gas arc (MIG) process, and FIG. 1(b) showing a tungsten inert gas arc (TIG) process. In FIG. 1(a), a parent plate 1 consisting of a pair of copper plates with their edges adjacent to each other is being welded. The gap between these edges, that is, the root gap, is ordinarily in the range of 0 to 2.0 mm. If the root gap exceeds 2 mm., there is the risk of the arc impinging directly upon the carbon support. The parent plate 1 is placed on the backing support 2 made of carbon at its area to be welded, and, if necessary, they are clamped. A filler rod 3 which also serves as a positive electrode is held over the area to be welded with a distance therebetween, and the rod is relatively moved at a weld travel speed v (cm/sec) with respect to the welding area or part in the direction perpendicular to the drawing. Two cases are actually possible, i.e., one case where the electrode 3 is moved, and the other case where the parent plate 1 is moved.

An arc 4 is formed between the electrode 3 and the welding part 1a of the parent plate, and the electrode 3 and a portion of the parent plate 1 are fused by the arc heat thereby to form a weld pool (not shown) in the welding part 1a. Ordinarily, an inert gas 5 is supplied around the arc through an outer tube of the electrode 3 to provide an atmosphere of the inert gas.

The TIG process shown in FIG. 1(b) can also be used for the purpose of the present invention substantially in the same manner as the MIG process shown in FIG. 1(a), except that the electrode 3 which also serves as the positive electrode is divided into a tungsten positive electrode 3b and filler rod 7.

The parent plate usable for the present invention is substantially pure copper or a high electrically conductive alloy composed primarily of copper and having an electric conductivity of at least 65% of the International Anneal Copper Standard (IACS). If such a plate is used, the change in coefficient of heat transfer will be so slight that it will not substantially influence the welding performance.

The material of the filler rod 3 or 7 is substantially the same as that of the parent plate.

The parent plate appropriate for the present invention has a thickness of at least 5 mm. According to a conventional welding process, it has been difficult to weld parent plates of copper having such a thickness without pre-heating. In accordance with the present invention, it is possible to weld parent plates having a thickness of up to at least 25 mm. by one layer one side welding. Of course, a thicker plate, e.g., of 100 mm in thickness, can be welded, if multi-layer deposition is effected.

Welding is ordinarily carried out in a flat position by positioning the electrode rod 3 or 3b perpendicular to or at an angle of upto about 15° from the vertical to the parent plate 1.

Figure 2:
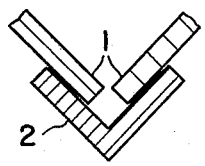
FIG. 2 is a cross-sectional view illustrating another arrangement of a parent plate and a backing support.

The mutual orientation of a pair of the copper plates to be welded constituting the parent plate is not only flat as shown in FIG. 1, but may be perpendicular as shown in FIG. 2 or an intersecting arrangement at any other dihedral angle.

Figure 3:
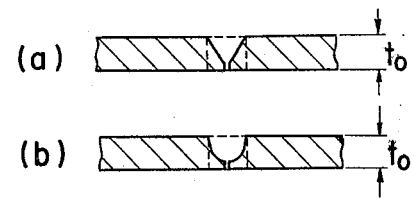
FIGS. 3(a) and 3(b) are cross-sectional views illustrating examples of parent plates having grooves.

As is shown in FIGS. 1 and 2, the welding process of the present invention makes it possible to weld a parent plate having square edges at the welding part. Accordingly, it is not necessary to provide a groove in the parent plate in particular. However, as is shown in FIGS. 3(a) and 3(b), it is possible to form a groove of a V shape, U shape or any other suitable shape for the purpose of relieving the stress generated within weld areas. In this case, it is considered that welding is carried out on a parent plate having a modified thickness of t:

$$t = t_o \times (1 - {}^rg) \qquad (6)$$

wherein
- $t_o$ is a thickness of a non-grooved part,
- ${}^rg$ is a cross section ratio of the groove at the welding part, i.e., the ratio of the section occupied by the groove to the section surrounded by dotted lines in the figures.

The carbon backing support 2 used in the present invention may be composed of graphite, solid amorphous carbon, or a heat-resistant material such as ceramics with its surface covered with graphite or carbon.

Welding is carried out by using a direct-current arc of reverse polarity connection as is shown in FIG. 1. This is because such an arc produces a rapid melting rate of the filler rod when the MIG process is adopted and has an excellent cleaning action on welding areas.

Examples of the shielding gas which may be used in the present invention are an inert gas such as Ar, He, $N_2$ or mixtures thereof. Among these, a He - Ar mixture consisting of He in a concentration of 15 to 80% and Ar contributes to a stable arc and a constant depth of penetration, and it is, thus, particularly preferable. The shielding gas is supplied at a rate of, e.g., 60 to 150 l/min.

Figure 4:
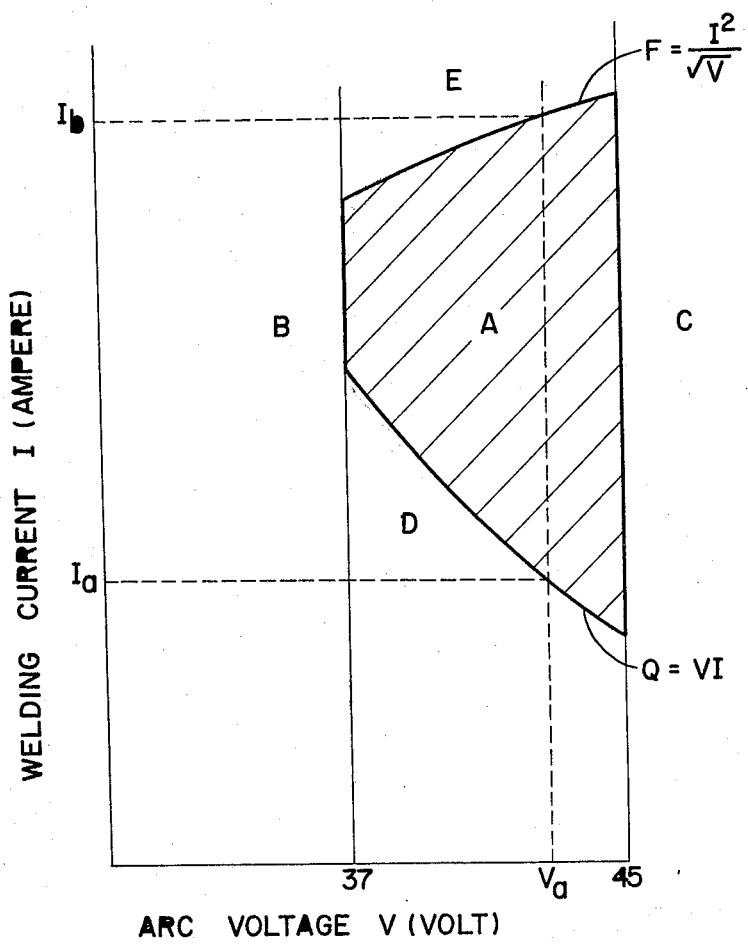
FIG. 4 is a graph indicating a current-voltage region suitable for the satisfactory welding of the present invention.

In the welding process of the present invention, the voltage V (volt) and the current I (ampere) used must meet the above stated formulae (1) to (3). FIG. 4 is an I-V graph indicating this relationship, in which A designates a stable welding region of the present invention. A region B in which the arc voltage is below 37 volts causes spattering of the weld pool, thereby failing to produce a sound surface of the weld. On the other hand, in a region C wherein the arc voltage exceeds 45 volts, the arc length becomes too long, and air is easily engulfed into the shielding gas, whereby blow holes are formed on the surface of the bead because of imperfect shielding, i.e., a nonuniform bead is formed. Accordingly, the arc voltage V should be in the range of 37 to 45 volts. The arc length, i.e., the distance between the electrode 3 or 3b and the weld areas is in the range of about 2 to 10 mm. at this voltage range.

In a region D wherein VI is less than Q, the heat input is insufficient, thus, resulting in poor penetration. In addition, in a region E wherein $I^2/\sqrt{V}$ is greater than F, the perforating action of the arc becomes excessive, and the arc acts on the backing support to give rise to a great number of blow holes in the weld bead.

In this case, the parameters Q and F are experimentally determined as follows. When the welding current is gradually increased at a specific voltage Va (e.g., 40 volts) within the range of "to 45 volts, penetration to the underside of the copper parent plate is obtained at a certain current value Ia. The minimal current value Ia and that voltage value Va at which the penetration to the underside of the copper parent plate is attained result in the parameter Q according to the following equation:

$$Q = IaVa \qquad (8)$$

When the welding current is further increased, the current passes through the stable welding region A, and blow holes begin to occur in the weld bead because of the decomposition of the backing support at a current value Ib. From the minimal current value Ib and the voltage Va at which blow holes begin to be formed, the parameter F is determined by the following equation:

$$F = Ib^2 / \sqrt{Va}$$

Since the parameters F and Q can be determined by carrying out one continuous welding run while gradually increasing the welding current with the other conditions kept constant and observing the condition of the weld bead, the determination of these parameters is very easy although they must be experimentally determined.

As factors having influence on the parameters F and Q, the material, thickness and joint configuration of the parent plate, the type of the inert gas, the type and diameter of the electrode rod, the welding process, i.e., MIG or TIG process, the shielding method, the weld travel speed, whether or not pre-heated is used, and its extent if used may be mentioned. The above described procedure for determining the parameters F and Q is experimentally carried out by keeping these factors and the arc voltage V constant. This process is, therefore, favorable for an accurate determination of the proper current level.

However, among these factors, the main factors which substantially influence the parameters F and Q are the thickness and joint configuration of the parent plate, the welding velocity and pre-heating. Accordingly, in the case of butt welding without pre-heating, with which the present invention is mainly concerned, it was found that an approximate level of proper current could be determined by incorporating the influence of the thickness t (cm) of the parent plate (when a groove is formed, a modified thickness according to the aforementioned equation (6)) and the weld travel speed v (cm/sec) into the above equations (2) and (3). That is, a current value I (ampere) and a voltage value V (volt) may be determined in such a manner as to meet the following empirical formulae (9) and (10):

$$IV/tv > 50,000 \qquad (9)$$

$$(1/\sqrt{V})(I/tv)^2 < 346,000 \qquad (10)$$

where V is a value of 37 to 45 volts and t and v are the same as those defined above.

The present invention will be illustrated in more detail by the following examples.

EXAMPLE 1

The state of weld beads were observed after welding runs carried out at various arc voltages V and welding current I under the following initial conditions:

| | | |
|---|---|---|
| (a) | Material of copper parent plate | oxygen-free copper (102% IACS) |
| (b) | Thickness of copper parent plate | 6 mm |
| (c) | Joint of copper parent plate | I shape butt (square edge) |
| (d) | Welding process | MIG process |
| (e) | Electrode rod | oxygen-free copper wire of a diameter of 2.4 mm |
| (f) | Shielding | double shielding |
| | Outer gas | Ar gas at a flow rate of 50 l/min |
| | Inner gas | Ar gas at flow rate of 12.5 l/min + He gas at a rate of 37.5 l/min |
| (g) | Weld travel speed | 40 cm/min |
| (h) | Pre-heating | none |

The results are shown in Table 1. In table 1, the unshaded circle represents a weld bead in which no defects were observed and the back bead was flat, the completely shaded circle represents poor penetration, the circle shaded on one side of a vertical diameter represents an irregular bead (blow holes were formed due to engulfment of air in the shielding gas), and the circle shaded below a horizontal diameter represents the formation of blow holes in the weld bead due to reaction with the backing support.

Table 1

| Test No. | Arc voltage (volt) | Welding current (ampere) | State of weld bead | $\frac{I}{tv}(\frac{Amp}{cm^2/sec})$ | Symbol |
| --- | --- | --- | --- | --- | --- |
| 1-1 | 34 | 600 | spattering | 1500 | ◐ |
| 2 | 36 | 540 | " | 1350 | ◐ |
| 3 | 36 | 590 | " | 1475 | ◐ |
| 4 | 38 | 500 | poor penetration | 1250 | ● |
| 5 | 38 | 570 | no defects flat bead | 1425 | ○ |
| 6 | 40 | 490 | poor penetration | 1225 | ● |
| 7 | 40 | 520 | poor penetration | 1300 | ○ |
| 8 | 40 | 580 | " | 1450 | ○ |
| 9 | 40 | 600 | blow holes | 1500 | ◓ |
| 10 | 42 | 450 | poor penetration | 1125 | ● |
| 11 | 42 | 470 | " | 1175 | ● |
| 12 | 42 | 500 | no defects, flat bead | 1250 | ○ |
| 13 | 42 | 570 | " | 1425 | ○ |
| 14 | 42 | 590 | " | 1475 | ○ |
| 15 | 42 | 620 | blow holes | 1550 | ◓ |
| 16 | 44 | 600 | no defects, flat bead | 1500 | ○ |
| 17 | 45 | 560 | " | 1400 | ○ |
| 18 | 47 | 600 | irregular bead | 1500 | ◐ |
| 19 | 48 | 500 | " | 1250 | ◐ |

On the basis of the results shown in Table 1, the numerical values of Q and F were determined as 20,000 and 55,360, respectively. Accordingly, the region of the proper welding conditions for this example of the present invention is one defined by the following formulae:

$$V = 37-45 \quad (1)$$

$$VI > 20,000 \quad (2-1)$$

$$I^2/\sqrt{V} < 55,360 \quad (3-1)$$

Figure 5:
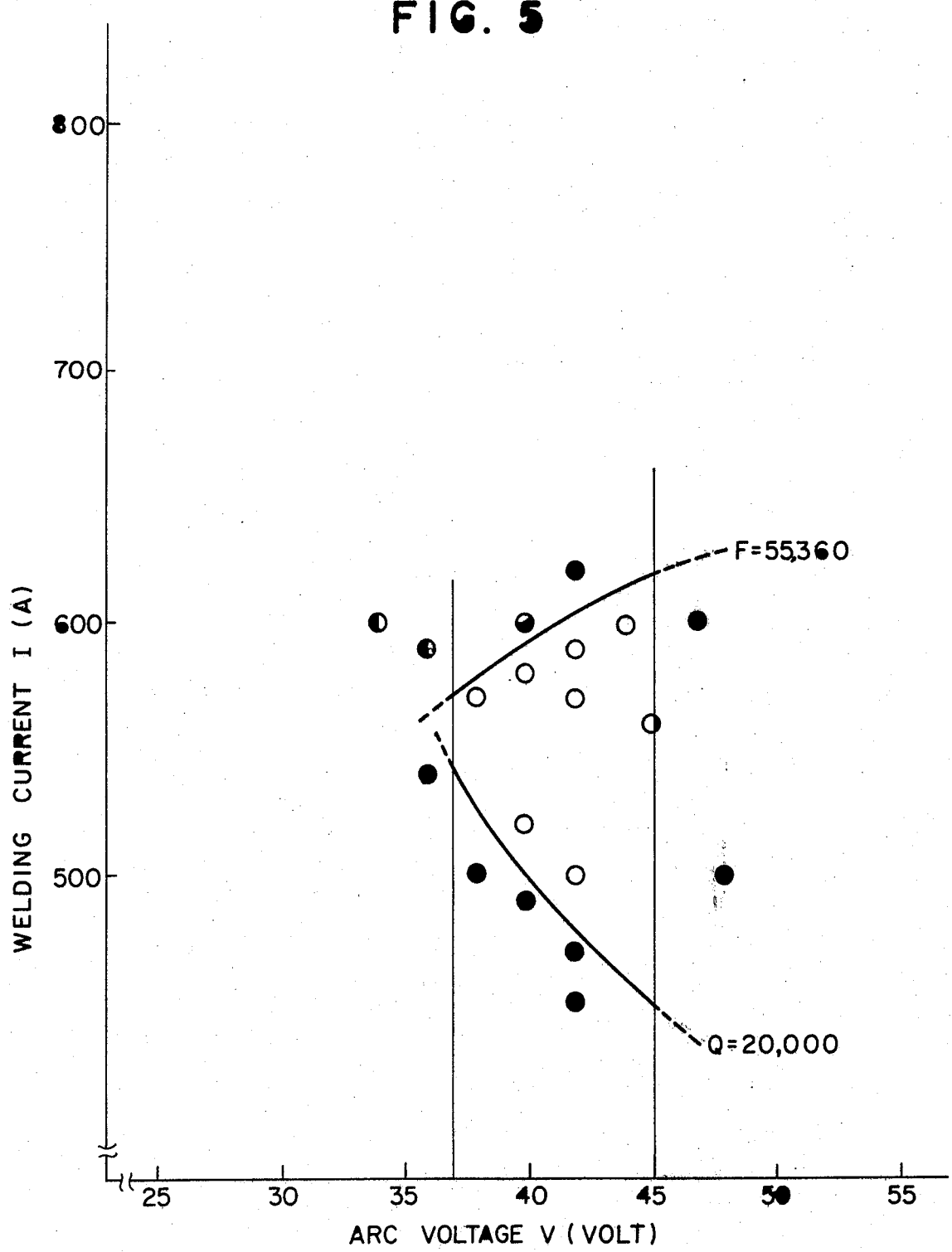
FIGS. 5, 8 and 9 are graphs indicating current-voltage regions suitable for the satisfactory welding of the present invention based on examples described hereinafter.
Figure 6:
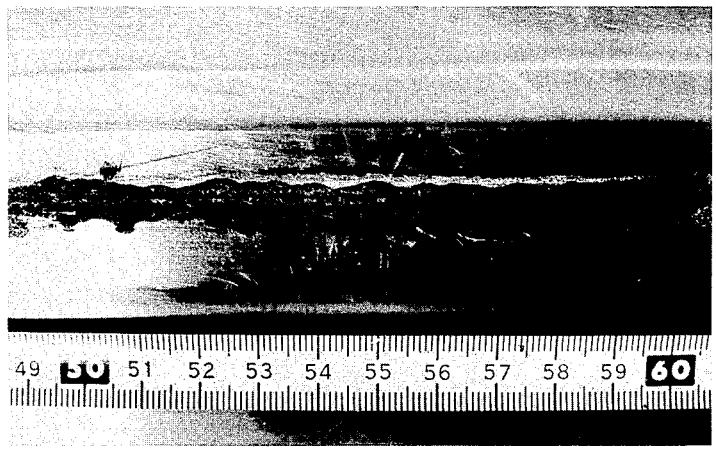
FIGS. 6 and 7 are photographs illustrating the appearance of a sound bead and a poor bead, respectively.
Figure 7:
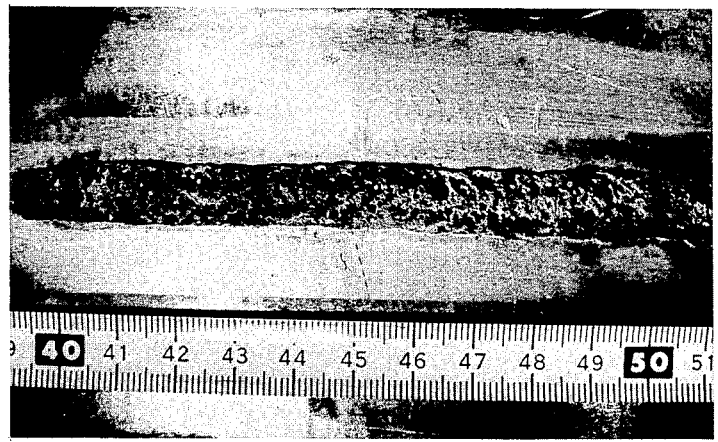

These results are collectively shown in FIG. 5. FIGS. 6 and 7 are photographs showing appearances of the back bead obtained by test No. 12 in Table 1 carried out under the welding conditions within the proper region of the present invention (FIG. 6) and the back bead obtained by test No. 15 in Table 1 carried out under the welding conditions outside the proper region of the present invention (FIG. 7).

As is shown in FIG. 6, the back bead according to the present invention exhibits a clean and flat appearance, while the back bead outside the present invention has a large number of blow holes as is shown in FIG. 7.

EXAMPLE 2

Welding was carried out by using the same initial conditions as those described in Example 1 except that a parent plate of a thickness of 10 mm of deoxidized copper containing 0.1% of Ag (90% ICAS) was used, and the weld travel speed was 30 cm/min, at various arc voltages and welding currents listed in Table 2. The states of the resultant weld beads were observed to be as shown in Table 2 and FIG. 8 using similar symbols as used in FIG. 5. The meanings of the symbols are identical to those of the corresponding symbols explained in Example 1, and briefly explained in Table 2.

On the basis of the states of the weld beads observed, parameters Q and F were determined in the same manner as in Example 1 and found to be 25,000 and 86,500, respectively.

Accordingly, the region of the proper welding conditions in this example is one defined by the following formulae:

$$V = 37-45 \quad (1)$$

$$VI < 25,000 \quad (2-2)$$

$$I^2/\sqrt{V} > 86,500 \quad (3-2)$$

Figure 8:
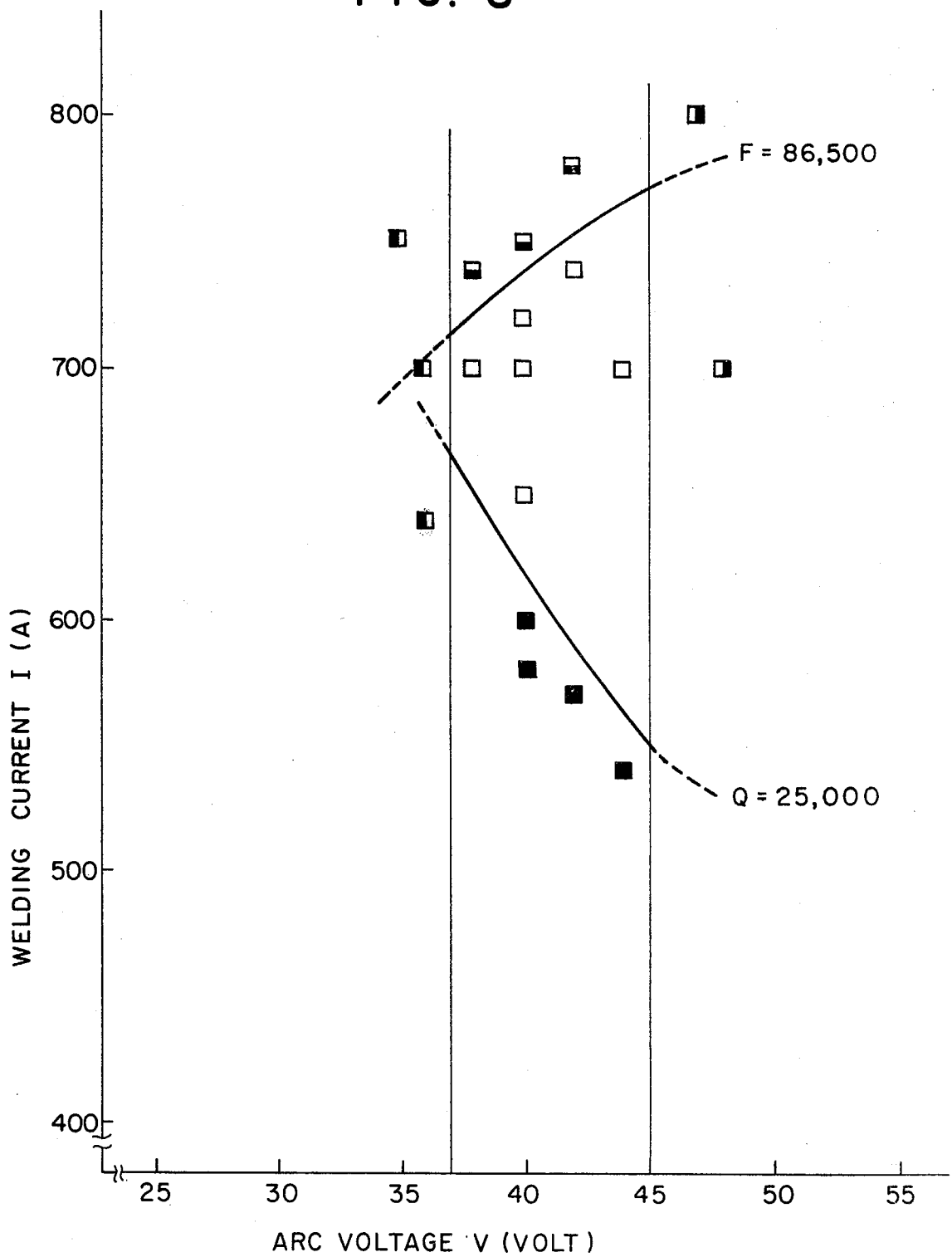

The results are also shown in FIG. 8.

EXAMPLE 3

Welding was carried out by using the same initial conditions as those defined in Example 1 except that a parent plate of a thickness of 15 mm. of deoxidized copper containing 0.1% of Ag (90% ICAS) was used, and the weld travel speed was 25 cm/min., at various arc voltages and welding currents listed Table 3. The states of the resultant weld beads were observed to be as shown in Table 3 and FIG. 9 using similar symbols as those used in FIG. 5. The meaning of the symbols are identical to those of the corresponding symbols explained in Example 1 and briefly explained in Table 3.

On the basis of the states of the weld beads observed, parameters Q and F were determined in the same manner as that described in Example 1 and found to be 31,250 and 135,150, respectively.

Table 2

| Test No. | Arc voltage (volt) | Welding current (ampere) | State of weld bead | $\frac{I}{tv}(\frac{Amp}{cm^2/sec})$ | Symbol |
| --- | --- | --- | --- | --- | --- |
| 2-1 | 35 | 750 | spattering | 1500 | ◨ |
| 2 | 36 | 640 | " | 1280 | ◨ |
| 3 | 36 | 700 | " | 1400 | ◨ |
| 4 | 38 | 700 | no defects, flat bead | 1400 | □ |
| 5 | 38 | 740 | blow hole | 1480 | ◩ |
| 6 | 40 | 580 | poor penetration | 1160 | ■ |

Table 2-continued

| Test No. | Arc voltage (volt) | Welding current (ampere) | State of weld bead | $\frac{I}{tv}$ ($\frac{Amp}{cm^2/sec}$) | Symbol |
| --- | --- | --- | --- | --- | --- |
| 7 | 40 | 600 | " | 1200 | ■ |
| 8 | 40 | 650 | no defects, flat bead | 1300 | □ |
| 9 | 40 | 700 | " | 1400 | □ |
| 10 | 40 | 720 | " | 1440 | □ |
| 11 | 40 | 750 | blow hole | 1500 | ■ |
| 12 | 42 | 570 | poor penetration | 1140 | ■ |
| 13 | 42 | 630 | no defects, flat bead | 1260 | □ |
| 14 | 42 | 740 | " | 1480 | □ |
| 15 | 42 | 780 | blow hole | 1560 | ■ |
| 16 | 44 | 540 | poor penetration | 1080 | ■ |
| 17 | 44 | 700 | no defects, flat bead | 1400 | □ |
| 18 | 46 | 800 | irregular bead | 1600 | ◨ |
| 19 | 48 | 700 | " | 1400 | ◨ |

Table 3

| Test No. | Arc voltage (volt) | Welding current (ampere) | State of weld bead | $\frac{I}{tv}$ ($\frac{Amp}{cm^2/sec}$) | Symbol |
| --- | --- | --- | --- | --- | --- |
| 3-1 | 34 | 920 | spattering | 1472 | ▲ |
| 2 | 36 | 840 | " | 1344 | ▲ |
| 3 | 37 | 940 | blow hole | 1504 | ▲ |
| 4 | 37.5 | 790 | poor penetration | 1264 | ▲ |
| 5 | 38 | 880 | no defects, flat bead | 1408 | △ |
| 6 | 40 | 760 | poor penetration | 1216 | ▲ |
| 7 | 40 | 820 | no defects, flat bead | 1312 | △ |
| 8 | 40 | 860 | " | 1376 | △ |
| 9 | 40 | 910 | " | 1456 | △ |
| 10 | 40 | 940 | blow hole | 1504 | ▲ |
| 11 | 42 | 900 | no defects, flat bead | 1440 | △ |
| 12 | 42 | 950 | blow hole | 1520 | ▲ |
| 13 | 43 | 720 | poor penetration | 1152 | ▲ |
| 14 | 43 | 800 | no defects, flat bead | 1280 | △ |
| 15 | 45 | 980 | blow hole | 1568 | ▲ |
| 16 | 47 | 840 | irregular bead | 1344 | ▲ |

Accordingly, the region of the proper welding conditions for this example is one defined by the following formulae:

$$V = 37\text{–}45 \tag{1}$$

$$VI > 31,250 \tag{2-3}$$

$$I^2/\sqrt{V} < 135,120 \tag{3-3}$$

Figure 9:
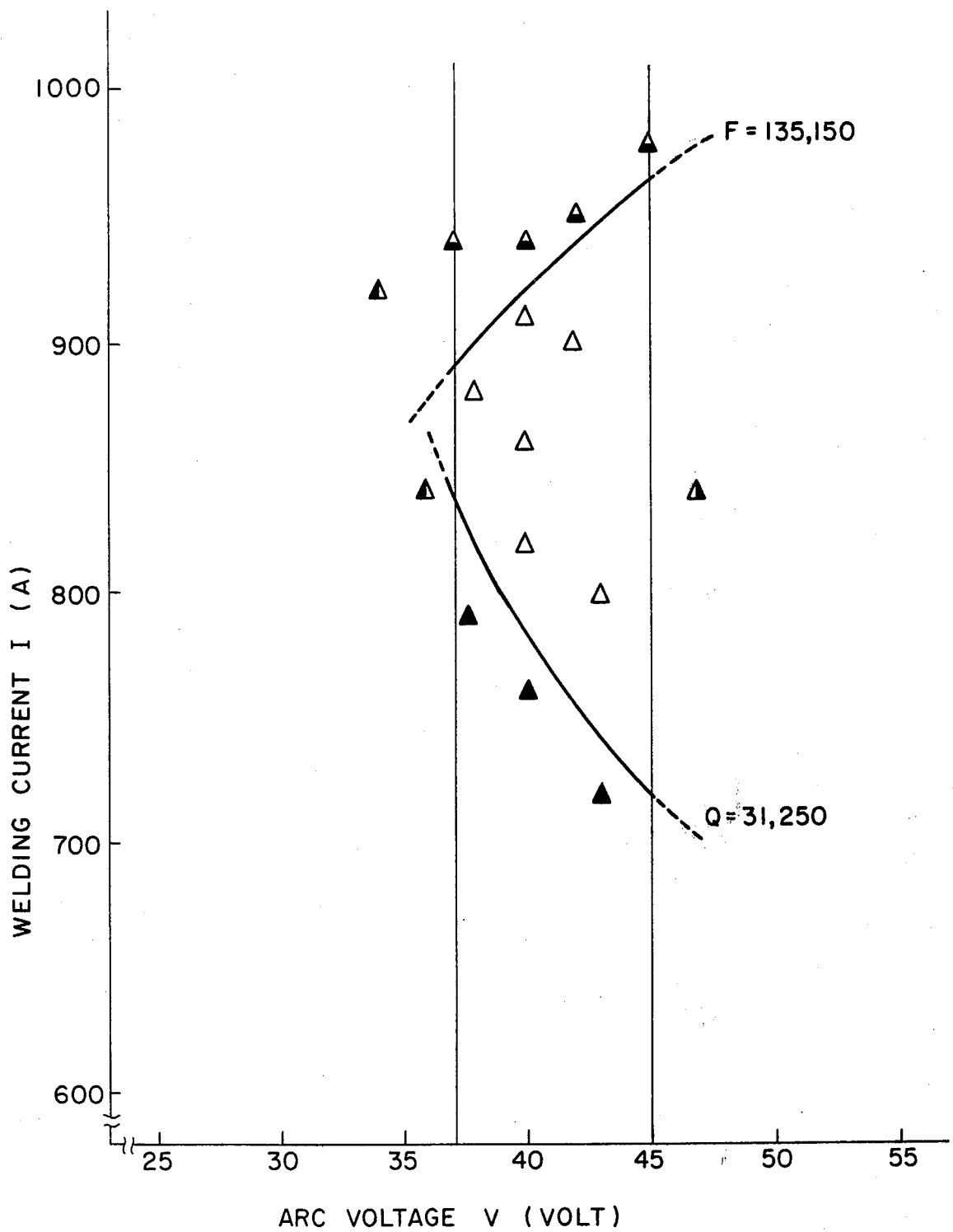

These results are also shown in FIG. 9.

The above described results of Examples 1, 2, and 3 indicate that the formulae (2) and (3) are useful for determining the proper welding current under the constant initial conditions.

Figure 10:
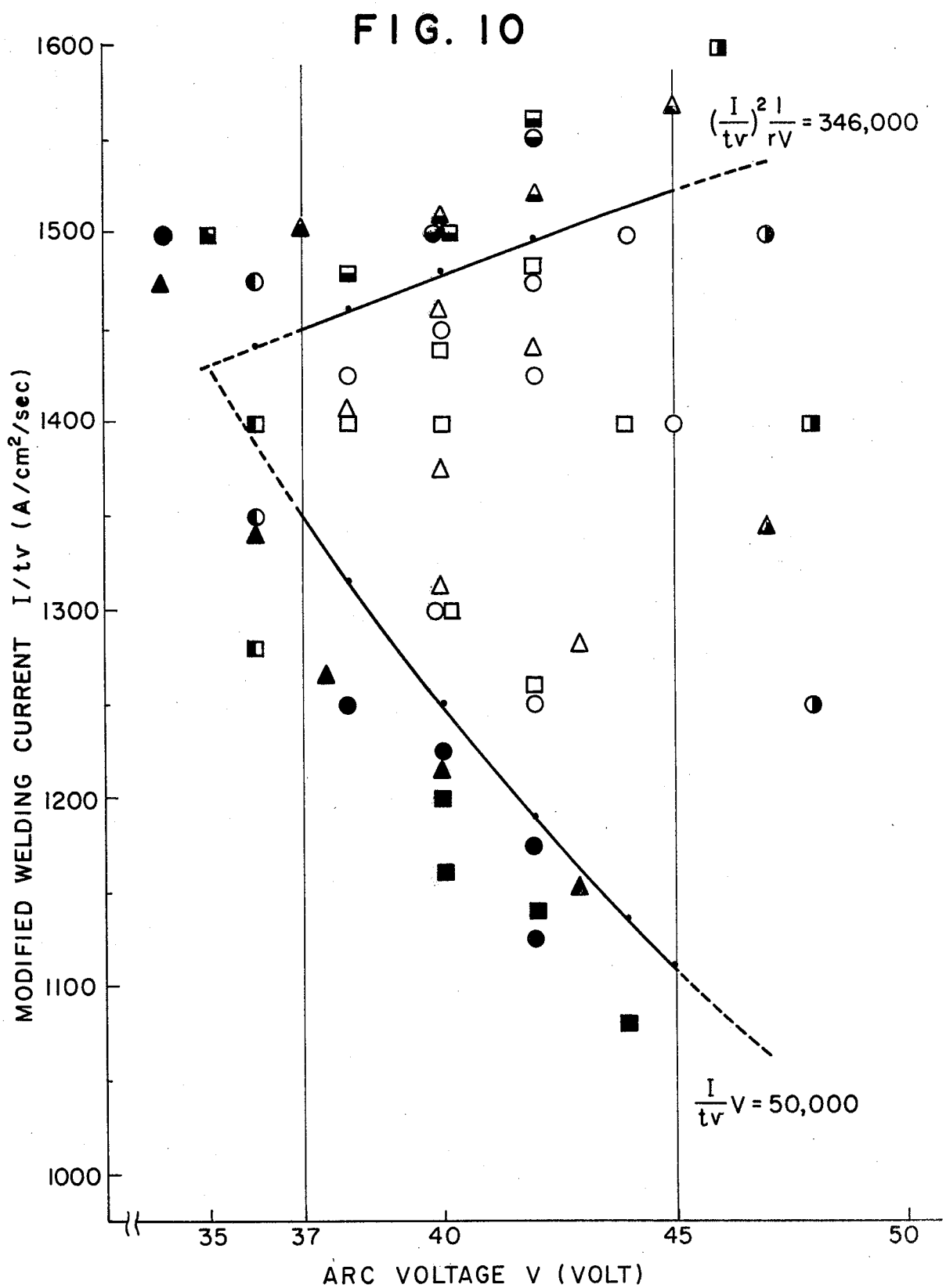
FIG. 10 is a graph indicating a proper current-voltage region for welding without pre-heating.

FIG. 10 is a graph wherein the results of Examples 1, 2, and 3 are plotted with the same evaluation symbols for the welding results as those used in FIGS. 5, 8 and 9. In this graph, the ordinate represents modified current I/tv and the abscissa represents arc voltage V. This graph indicates that the formulae (9) and (10) are useful for determing the approximate level of the welding current in a welding process without pre-heating.

We claim:

1. A process for welding a pair of thick copper plates which comprises welding the pair of copper plates having respective edges placed adjacent to each other on a backing support made of carbon at their adjacent edges in an atmosphere of an inert gas by melting a filler metal with the use of a direct current arc generated between said copper plates connected to the negative pole and a positive electrode, with an arc voltage V (volt) and a current I (ampere) satisfying the conditions:

$$V = 37 \text{ through } 45 \tag{1}$$

$$VI > Q \tag{2}$$

$$I^2/\sqrt{V} < F \tag{3}$$

wherein Q and F are respectively determined from the equations:

$$Q = VaIa \tag{4}$$

$$F = Ib^2/\sqrt{Vb} \tag{5}$$

wherein Ia (ampere) is the minimum current at which penetration to the underside of the copper plates is obtained, and Ib (ampere) is the minimum current at which a blow hole is formed in the weld by the decomposition of the backing support at a specific voltage Va within the above stated range (1).

2. A process as claimed in claim 1 wherein the pair of copper plates have a thickness of at least 5 mm.

3. A process as claimed in claim 1 wherein the welding is carried out without pre-heating the copper plates to be welded, and the voltage V (volt) and the current I (ampere) satisfy the formulae:

$$IV/tv > 50,000 \tag{9}$$

$$1/\sqrt{V}\,(I^2/tv) < 346,000 \tag{10}$$

wherein v represents the weld travel speed (cm/sec) and t represents the thickness (cm) of the copper plate.

4. A process as claimed in claim 1 wherein the filler metal is utilized as the positive electrode.

5. A process as claimed in claim 1 wherein the positive electrode consists of a tungsten electrode, and the filler metal is inserted into the arc to melt it.

6. A process as claimed in claim 3, wherein the adjacent edges of the pair of copper plates are square edges.

7. A process as claimed in claim 3 wherein a groove is formed at the adjacent edges of the pair of the copper plates, and the thickness t (cm) of the copper plate is given by the equation:

$$t = t_o (1 - r_g)$$

wherein $t_o$ represents the thickness of the non-grooved part of the copper plate, and $r_g$ represents the groove ratio of the cross section of the edges.

8. A process as claimed in claim 1, wherein the inert gas is a gaseous mixture comprising He in a concentration of 15 to 80% and Ar.

9. A process as claimed in claim 1 wherein the copper plates are made of substantially pure copper or an alloy consisting predominantly of copper and having an electric conductivity of at least 65% of the International Annealed Copper Standard.

* * * * *